(12) United States Patent
Wang et al.

(10) Patent No.: US 10,915,174 B1
(45) Date of Patent: Feb. 9, 2021

(54) ELECTRONIC DEVICES WITH DIRECTIONAL HAPTIC OUTPUT

(71) Applicant: Apple Inc., Cupertino, CA (US)

(72) Inventors: Paul X. Wang, Cupertino, CA (US); Michael Y. Cheung, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/988,936

(22) Filed: May 24, 2018

Related U.S. Application Data

(60) Provisional application No. 62/535,166, filed on Jul. 20, 2017.

(51) Int. Cl.
  *G06F 3/01* (2006.01)
  *H04W 88/02* (2009.01)

(52) U.S. Cl.
  CPC .............. *G06F 3/016* (2013.01); *H04W 88/02* (2013.01)

(58) Field of Classification Search
  CPC ................................ G06F 3/016; H04W 88/02
  See application file for complete search history.

(56) References Cited

U.S. PATENT DOCUMENTS

| | | | |
|---|---|---|---|
| 8,766,953 B1 | 7/2014 | Cheatham, III et al. | |
| 8,981,682 B2 | 3/2015 | Delson et al. | |
| 9,720,257 B2 * | 8/2017 | Han | G02C 9/02 |
| 10,095,311 B2 * | 10/2018 | Levesque | G02B 27/017 |
| 2007/0236450 A1 | 10/2007 | Colgate et al. | |
| 2009/0088220 A1 * | 4/2009 | Persson | G06F 1/1626 455/567 |
| 2010/0117809 A1 * | 5/2010 | Dai | G06F 3/041 340/407.2 |
| 2010/0141410 A1 | 6/2010 | Aono et al. | |
| 2012/0229424 A1 | 9/2012 | Behles et al. | |
| 2012/0286847 A1 | 11/2012 | Peshkin et al. | |
| 2013/0113760 A1 | 5/2013 | Gossweiler, III et al. | |
| 2013/0307790 A1 * | 11/2013 | Konttori | G06F 3/0488 345/173 |
| 2014/0232646 A1 * | 8/2014 | Biggs | G06F 3/016 345/156 |
| 2015/0261015 A1 * | 9/2015 | Han | G02B 27/0176 351/158 |
| 2015/0293592 A1 * | 10/2015 | Cheong | G06F 3/016 345/173 |

(Continued)

*Primary Examiner* — Ibrahim A Khan
(74) *Attorney, Agent, or Firm* — Treyz Law Group, P.C.; G. Victor Treyz; Matthew R. Williams

(57) ABSTRACT

A system may have one or more electronic devices that include user input sensors such as force sensors, touch sensors, motion sensors, and other input devices. To provide a user with output, devices may have visual output components such as displays, audio output components, and haptic output components. Haptic output components may be used to apply an apparent force in a given direction relative to a device housing surface such as a sidewall surface or other device surface. Control circuitry in a device may direct a haptic output component to produce the apparent force in a direction perpendicular to the housing surface or tangential to the housing surface. The apparent applied force may be provided as feedback while the control circuitry is directing a display in the device or in an external device to provide a user with visual content based on the user input.

17 Claims, 8 Drawing Sheets

(56) References Cited

U.S. PATENT DOCUMENTS

| | | |
|---|---|---|
| 2015/0301602 A1 | 10/2015 | Dow et al. |
| 2016/0124603 A1* | 5/2016 | Park ..................... G06F 3/0488 345/173 |
| 2016/0378190 A1* | 12/2016 | Park ....................... G06F 3/016 345/173 |
| 2017/0131772 A1* | 5/2017 | Choi ..................... G04G 21/08 |
| 2017/0185151 A1* | 6/2017 | Pahud .................... G06F 3/016 |
| 2018/0364853 A1* | 12/2018 | Pahud ................ G06F 3/03547 |

\* cited by examiner

ELECTRONIC DEVICES WITH DIRECTIONAL HAPTIC OUTPUT

This application claims the benefit of provisional patent application Ser. No. 62/535,166, filed Jul. 20, 2017, which is hereby incorporated by reference herein in its entirety.

FIELD

This relates generally to electronic equipment, and, more particularly, to electronic equipment that supplies haptic output.

BACKGROUND

Devices such as wearable devices sometimes incorporate haptic output components. Haptic output components may supply a user with haptic output while the user is interacting with software such as gaming software.

It can be challenging to design a haptic output device. If care is not taken, haptic output may too weak or may not provide a desired sensation for a user, haptic output may not be applied to an appropriate location on the body of a user, or a haptic output device may be overly bulky or difficult to use.

SUMMARY

A system may have one or more electronic devices for gathering input and providing output to a user. In configurations with multiple devices, the devices may communicate wirelessly. One device may be used as a controller for another device. In a single-device system, user input and output may be handled by the same device.

To gather user input, devices may include user input sensors such as force sensors, touch sensors, motion sensors, and other input devices. The user input that is gathered may be used to manipulate objects in a virtual world or to interact with other content being provided to a user.

To provide a user with output, devices may have visual output devices, audio output components, and haptic output components. For example, a head-mounted device may have a display for presenting virtual reality or mixed reality content to a user.

Haptic output components may be used to apply an apparent force in a given direction relative to a device housing surface such as a housing sidewall surface or other device surface. Control circuitry in a device may direct a haptic output component to produce the apparent applied force perpendicular to the surface or tangential to the housing surface. The apparent applied force may be provided as feedback while the control circuitry is directing a display in the device or in an external device to provide a user with visual content based on the user input. By adjusting the direction of the apparent applied force, a user may be provided with sensations such as increased or decreased weight, increased or decreased lateral force, friction (resistance to finger movement in a particular direction), slippage (finger movement assistance), rendered boundary effects, and/or other directional haptic effects.

DETAILED DESCRIPTION

A system may include one or more electronic devices. The electronic devices may be used to gather input from a user. In some configurations, a first electronic device may be used to control a second electronic device. For example, a first electronic device may serve as an input-output device for a second electronic device. Haptic output components may be included in the electronic devices to provide a user with haptic output.

Figure 1:
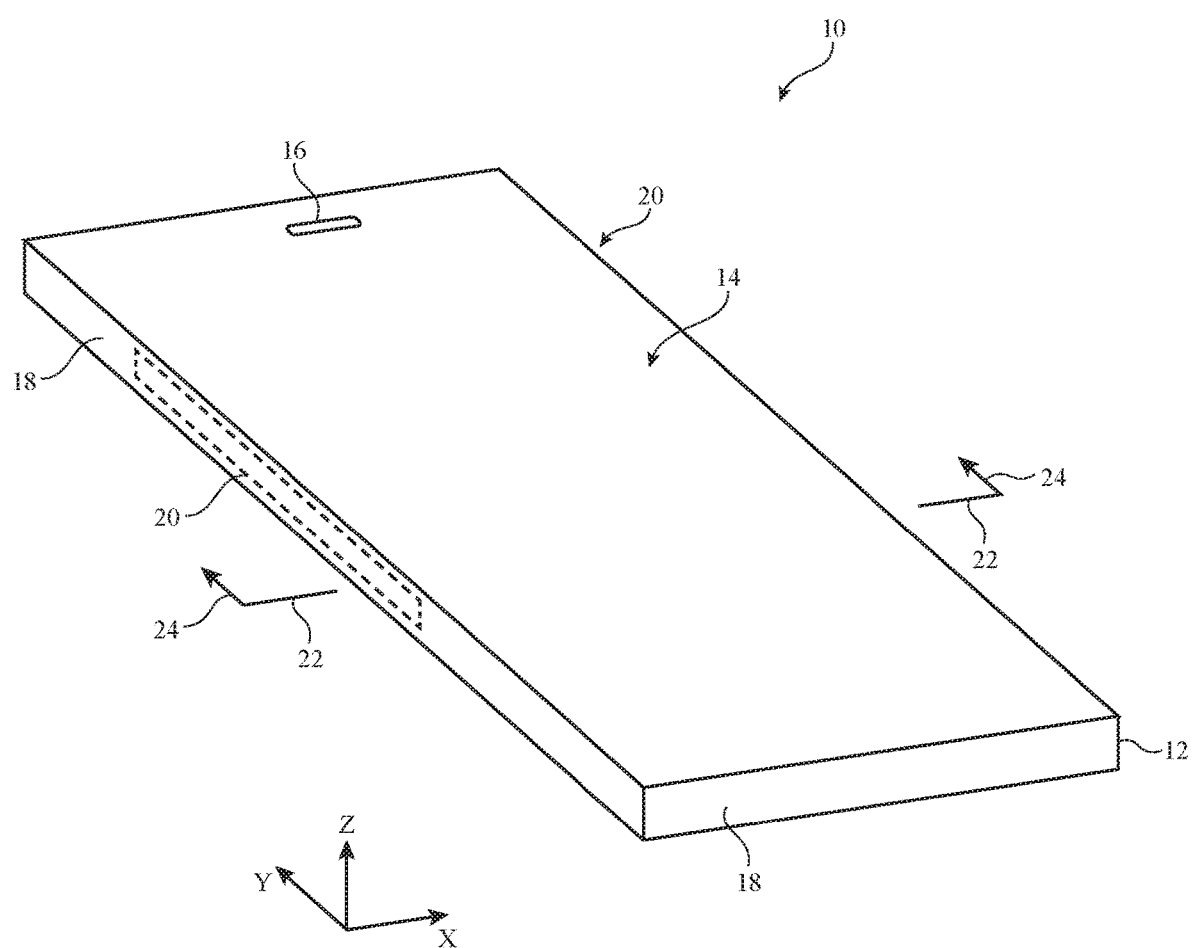
FIG. 1 is a perspective view of an illustrative electronic device in accordance with an embodiment.

FIG. 1 is a perspective view of an illustrative electronic device. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other head-mounted device worn on a user's head, a finger-mounted device, a glove, or other wearable or miniature device, a television, a computer display that does not contain an embedded computer, a gaming device, a navigation device, an embedded system such as a system in which electronic equipment with a display is mounted in a kiosk or automobile, an accessory such as a remote control, ear buds, or a case (cover) for a device, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes display 14. Display 14 has been mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma display pixels, an array of organic light-emitting diode pixels, an array of electrowetting pixels, or pixels based on other display technologies.

Display 14 may be protected using a display cover layer such as a layer of transparent glass or clear plastic. Openings may be formed in the display cover layer. For example, an opening may be formed in the display cover layer to accommodate a speaker port such as speaker port 18. Button openings may also be formed in the display cover layer. If desired, openings may be formed in housing 12 to form communications ports, holes for buttons, and other structures.

Device 10 may have opposing front and rear faces. Display 14 may be formed on the front face. A rear wall of housing 12 may be formed on the opposing rear face. Sidewalls 18 may extend between peripheral portions of display 14 on the front face and peripheral portions of the rear wall of housing 12 on the rear face. Sidewalls 18 may be formed from one or more structures that are separated from the rear wall structures of housing 12 and/or may have portions that are formed integrally with the rear wall of housing 12. Sidewalls 18 may extend vertically and may form planar sidewall surfaces and/or sidewalls 18 may have portions with curve cross-sectional shapes (e.g., so that the outer surfaces of sidewalls 18 are curved). Display 14 may have any suitable footprint (outline when viewed from above) such as rectangular footprint, an oval or circular shape, etc. In the example of FIG. 1, display 14 and device 10 have a rectangular outline and housing sidewalls 18 run along each of the four edges of display 14 and device 10. Other arrangements may be used for device 10, if desired.

Input-output components may be formed on sidewalls 18 (e.g., in the portion of housing 12 in regions 20 of sidewalls 18 and/or other portions of housing 12). When a user grips device 10, the user's fingers or other portions of a user's body may overlap regions 20 of sidewalls 18 and/or other portions of sidewalls 18 that have been provided with input-output components. The input-output components may include touch sensors, force sensors, and/or other input sensors for determining where a user has touched device 10. The input-output components may also include haptic output devices. For example, device 10 may include a strips of capacitive touch sensor electrodes in regions 20 that are overlapped by haptic output components in regions 20. Using this arrangement, user input can be sensed using a touch sensor formed from the touch sensor electrodes while haptic output may be supplied to the user by the associated haptic output components.

Haptic output devices in regions 20 (e.g., regions 20 on the left and right edges of device 10 in the example of FIG. 1 and/or other sidewall regions) and haptic output devices on other surface of device 10 (e.g., rear wall surfaces, portions of display 14, etc.) may be used to apply forces perpendicular to the surface(s) being contacted by a user's finger(s) and/or may be used to apply forces tangential to the surface (s) being contacted by the user's finger(s). Perpendicular forces (sometimes referred to as normal forces) may displace the user's finger inwardly or outwardly. Tangential forces (sometimes referred to as shear forces) push and/or pull the user's finger parallel to the surfaces of device 10.

Figure 2:
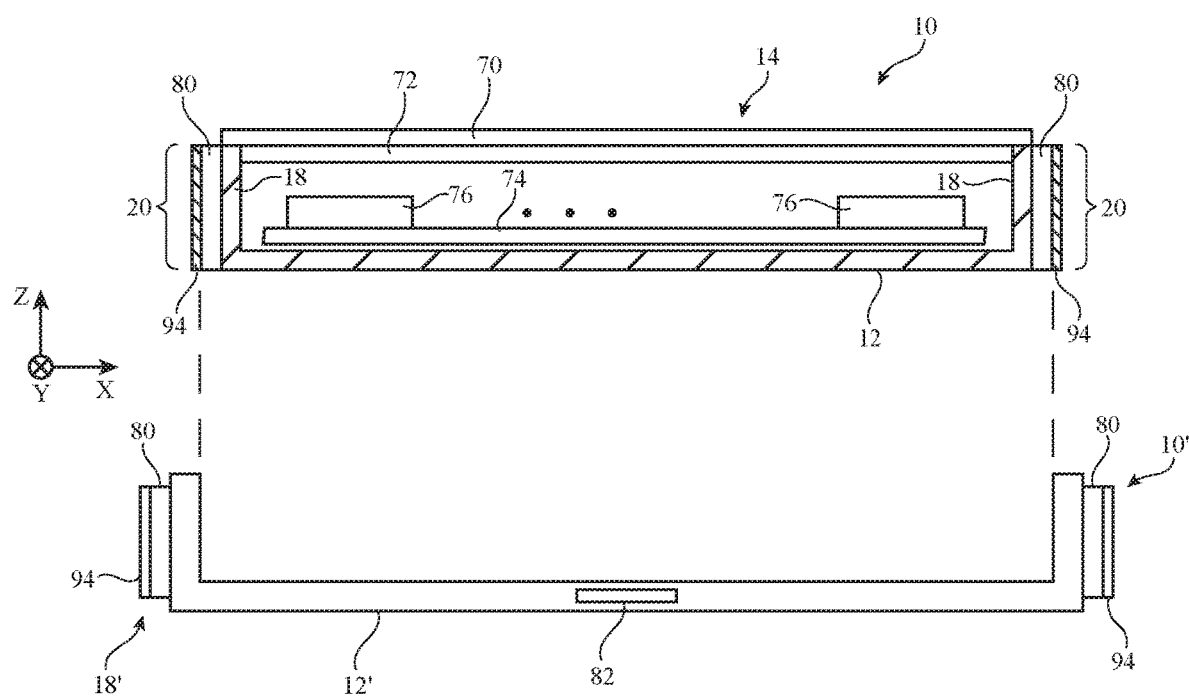
FIG. 2 is a cross-sectional side view of the illustrative electronic device of FIG. 1 in accordance with an embodiment.

A cross-sectional side view of electronic device 10 of FIG. 1 taken along line 22 and viewed in direction 24 is shown in FIG. 2. As shown in FIG. 2, display 14 of device 10 may be formed from a display module such as display module 72 mounted under a cover layer such as display cover layer 70 (as an example). Display 14 (display module 72) may be a liquid crystal display, an organic light-emitting diode display, a display formed from a pixel array having an array of light-emitting diodes formed from respective crystalline semiconductor dies, an electrophoretic display, a display that is insensitive to touch, a touch sensitive display that incorporates and array of capacitive touch sensor electrodes or other touch sensor structures, or may be any other type of suitable display. Display cover layer 70 may be layer of clear glass, a transparent plastic member, a transparent crystalline member such as a sapphire layer, or other clear structure. Display layers such as the layers of display layers (module) 72 may be rigid and/or may be flexible (e.g., display 14 may be flexible).

Display 14 may be mounted to housing 12. Device 10 may have inner housing structures that provide additional structural support to device 10 and/or that serve as mounting platforms for printed circuits and other structures. Structural internal housing members may sometimes be referred to as housing structures and may be considered to form part of housing 12.

Electrical components 76 may be mounted within the interior of housing 12. Components 76 may be mounted to printed circuits such as printed circuit 74. Printed circuit 74 may be a rigid printed circuit board (e.g., a printed circuit board formed from fiberglass-filled epoxy or other rigid printed circuit board material) or may be a flexible printed circuit (e.g., printed circuit formed from a sheet of polyimide or other flexible polymer layer). Patterned conductive traces within printed circuit board 74 may be used to form signal paths between components 76.

Haptic output components 80 may be mounted in regions 20 and/or other suitable areas of device 10 and housing 12. Sensors 94 (e.g., a capacitive touch sensor, a force sensor, etc.) may, if desired, be mounted so as to overlap haptic output components 80. Haptic output components 80 and/or sensors 94 may be mounted on exterior surfaces of housing 12, in the interior of housing 12 adjacent to the walls of housing 12 (e.g., so that haptic output devices 80 may provide haptic output through the walls of housing 12), and/or may be embedded within housing walls of housing 12. Configurations in which haptic output components 80 and sensors such as touch and force sensors are mounted on exterior surfaces of housing 12 may sometimes be described herein as an example. This is merely illustrative. Haptic output devices such as components 80 of FIG. 2 may be mounted on any suitable portions of housing 12 that allow haptic output to be provided to a user of device 10 and touch and force sensors may be mounted on any suitable portions of housing 12 that allow these sensors to gather user touch and force input.

If desired, haptic output components may be mounted on portions of a device case The case may be, for example, a battery case such as illustrative device 10' of FIG. 2 that includes a supplemental battery (battery 82) for supplying power to device 10 when device 10 is mounted in device 10'. Housing 12' of device (battery case) 10' may have sidewalls such as sidewalls 18' and/or other housing walls. Input-output components (e.g., touch sensors, haptic output components 80, etc.) may be mounted on the interior and/or exterior of walls 18', may be embedded partially or fully within walls 18', and/or may be supported by other portions of housing 12' of case 10' and may overlap haptic output components 80, as illustrated by optional sensors 94.

FIGS. 3, 4, 5, 6, 7, and 8 are diagrams of illustrative haptic output components 80.

Figure 3:
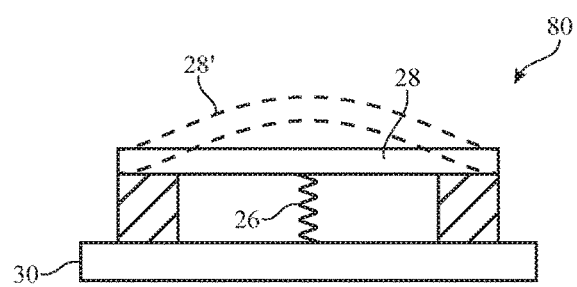
FIG. 3 is a cross-sectional side view of an illustrative haptic output component with a central deflecting portion in accordance with an embodiment.

Illustrative haptic output component 80 of FIG. 3 has a piezoelectric member such as member 28. A biasing structure such as spring 26 is interposed between support structure 30 and the lower surface of member 28 and configured to push upwards on member 28. During operation, control signals (e.g., control voltages) may be applied to member 28 using electrodes on the upper and lower surfaces of member 28. The control signals may be adjusted to adjust the tension of member 28. When member 28 is adjusted to exhibit a high tension, member 28 will compress spring 26 and will have a planar shape. When member 28 is adjusted to exhibit low tension, member 28 will relax and will be moved upwards to position 28' by spring 26.

Figure 4:
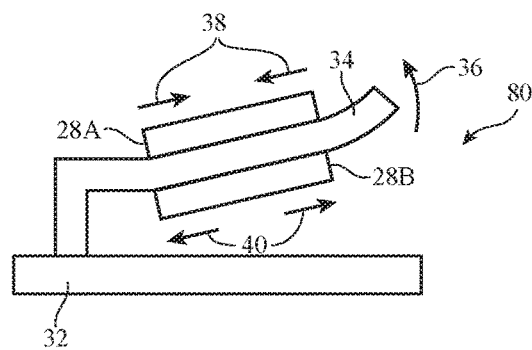
FIG. 4 is a cross-sectional side view of an illustrative deflecting beam haptic output component in accordance with an embodiment.

Illustrative haptic output component 80 may have a deflectable beam such as beam 34 of FIG. 4 that is attached to support structure 32. Piezoelectric members 28A and 28B may be coupled to the upper and lower surfaces of beam 34. Control signals may be supplied to electrodes in members 28A and 28B to cause these members to contract or expand. As shown in FIG. 4, for example, signals may be supplied to members 28A and 28B to cause member 28A to contract inwardly in directions 38 while causing member 28B to expand outwardly in directions 40. This causes beam 34 to deflect in direction 36.

Figure 5:
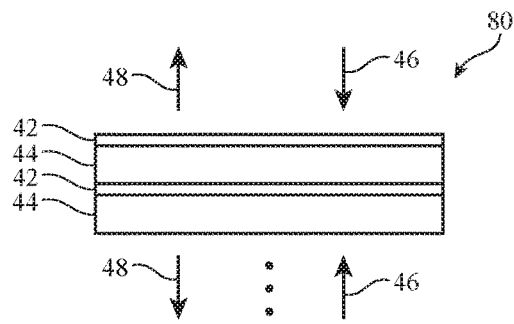
FIG. 5 is cross-sectional side view of an illustrative haptic output component based on a stack of haptic output structures in accordance with an embodiment.

Illustrative haptic output component 80 of FIG. 5 is formed from electrode layers 42 and adjustable material layers 44. During operation, control circuitry in device 10 may supply signals to electrode layers 42 that cause layers 44 to expand and contract. Multiple stacks of layers 42 and 44 may be included in component 80 to enhance the amount of displacement that is produced for a given applied signal. With one illustrative configuration, haptic output component 80 may be an electroactive polymer device (e.g., layers 44 may be formed from electroactive polymer). Arrangements of the type shown in FIG. 5 may also be used with piezoelectric ceramic layers, etc.

Figure 6:
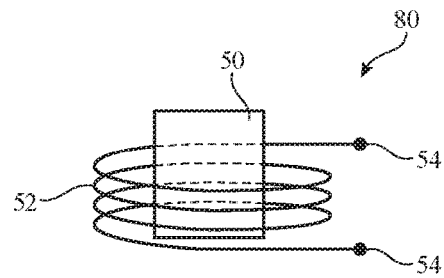
FIG. 6 is a side view of an illustrative voice coil haptic output component in accordance with an embodiment.

If desired, haptic output component 80 may be formed using electromagnetic structures. With one illustrative arrangement, which is shown in FIG. 6, haptic output component 80 is a voice coil actuator formed from a coil such as coil 52 and a corresponding magnet such as magnet 50. When current is supplied to terminals 54 of coil 52, a magnetic field is generated by coil 52. This magnetic field produces a force between magnet 50 and coil 52 and thereby causes magnet 50 and coil 52 to move relative to each other (e.g., vertically in the orientation of FIG. 6). Component 80 may use a moving coil design in which coil 52 is moved when current is applied to terminals 54 or a moving magnetic design in which magnet 50 is moved when current is applied to terminals 54. Haptic output components such as component 80 of FIG. 6 may sometimes be referred to as electromagnetic actuators. Any suitable geometry may be used for an electromagnetic actuator (rotary, linear, etc.). The configuration of FIG. 6 is merely illustrative.

Figure 7:
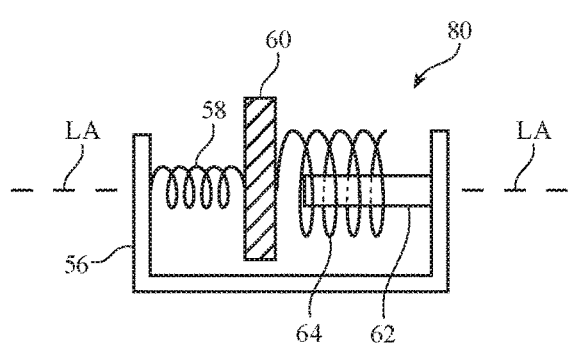
FIG. 7 is a cross-sectional side view of an illustrative linear resonance actuator haptic output component in accordance with an embodiment.

As shown in FIG. 7, haptic output component 80 may be a linear resonant actuator. Component 80 of FIG. 7 has a support structure such as support structure 56. Moving mass 60 is coupled to support structure 56 by spring 58. Coil 64 may receive a drive current and may interact electromagnetically with magnet 62. Coil 64 may be coupled to moving mass 60 and magnet 62 may be coupled to support structure 56 or vice versa, so that application of drive signals to coil 64 will cause moving magnet 60 to oscillate along axis LA.

Figure 8:
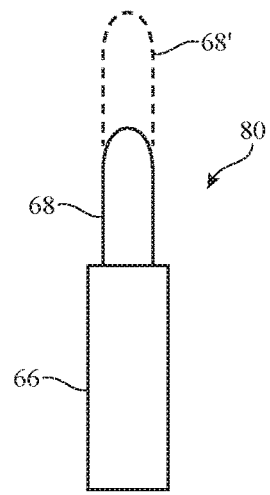
FIG. 8 is a side view of an illustrative haptic output component with a portion that extends when actuated in accordance with an embodiment.

As shown in FIG. 8, haptic output component 80 may have portion such as portion 68 that can be displaced (e.g., to a position such as displaced position 68' in the FIG. 8 example). Fluid such as pressurized air, rheological fluid that changes in viscosity under applied magnetic fields from an electromagnet in component 80, pressurized water, and/or other fluid may be introduced into a chamber in support structure 66 with controllable properties (pressure, viscosity, etc.), thereby adjusting the displacement of portion 68. Portion 68 may be an expandable diaphragm, may be a movable pin, or may be other suitable movable structure. If desired, an electromagnetic actuator (e.g., a servomotor or other motor, solenoid, etc.) can be used to adjust the displacement of portion 68.

The configurations for haptic output component 80 that are shown in FIGS. 3, 4, 5, 6, 7, and 8 are merely illustrative. In general, any suitable haptic output devices may be used in providing a user of an electronic device with haptic output.

Figure 9:
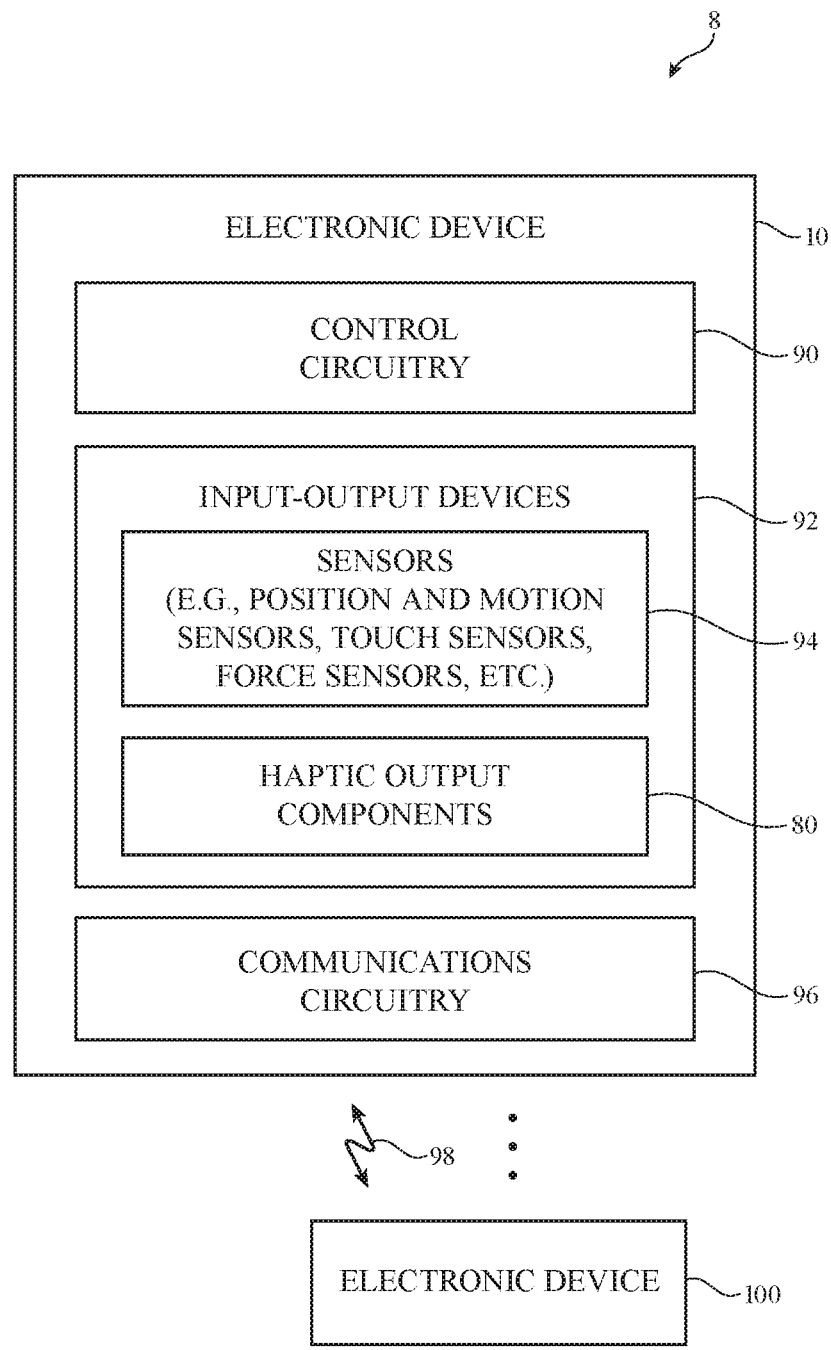
FIG. 9 is a schematic diagram of an illustrative electronic device in accordance with an embodiment.

FIG. 9 is a diagram of a system containing electronic devices of the type that may use haptic output components 80 to provide a user with haptic output. Electronic systems such as illustrative system 8 of FIG. 9 may include electronic devices such as electronic device 10 and electronic device 100. Device 10 may be used in supplying a user with haptic output. In some configurations, electronic device 100 can be omitted and device 10 can be used to provide visual and/or audio output to a user of device 10 in conjunction with the haptic output. The haptic output may, as an example, be provided as feedback while a user is supplying touch input, force input, motion input, or other input to device 10.

In other configurations, one or more supplemental devices in system 8 such as device 100 (and, if desired, an additional electronic device coupled to device 100) may be used in providing visual and/or audio output to a user while device 10 serves as a control device for device 100 (and any additional device coupled to device 100). Device 10 may, as an example, have touch sensors, motion sensors, and/or other sensors that gather user input. This user input may be used in manipulating visual objects displayed by a display in device 100 (as an example). Haptic output components 80 may be included in device 10 and may be used to provide a user with haptic output associated with the visual objects on device 100 that are being manipulated by the user. In this type of arrangement, device 100 (e.g., a laptop computer, a tablet computer, a television, a head-mounted with a display and speakers, a head-mounted display with a display and speakers that is coupled to a computer, a set-top box, or other host, etc.) may display computer-generated visual objects (e.g., a computer game, virtual reality environment, etc.) and associated audio while the user interacts with this content using device 10. If desired, haptic output components 80 may be included in device 100, so that haptic output may be provided both by device 10 and by device 100.

As illustrated by communications link 98, device 10 may communicate with one or more additional electronic devices such as electronic device 100. Links such as link 98 in system 8 may be wired or wireless communication links. Each device in system 8 such as device 10 may include communications circuitry such as communications circuitry 96 of device 10 for supporting communications over links such as link 98.

Communications circuitry 96 may include wired and wireless communications circuitry. Communications circuitry 96 in one device may be used to support communications over one or more wired or wireless communications links (e.g., link 98) with one or more additional devices (e.g., a peer device, a host, an accessory, etc.). Wireless circuitry in communications circuitry 96 may include one or more antennas and one or more radio-frequency transceiver circuits. Wireless communications circuitry may be used to support wireless communications over cellular telephone bands, wireless local area network bands, near field communications bands, etc.

As shown in FIG. 9, electronic device 10 may have control circuitry 90. Control circuitry 90 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 90 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 92 may be used to allow data to be supplied to device 10 and to allow data to be provided from device 10 to external devices. Input-output devices 92 may include buttons, joysticks, scrolling wheels, touch pads, key pads, keyboards, microphones, speakers, tone generators, cameras (e.g., cameras configured to visually monitor foot movements, etc.), displays and/or other light-emitting components, light-emitting diodes and other status indicators, data ports, etc. Input-output devices 92 may include sensors such as sensors 94. Sensors 94 may include force sensors, touch sensors, temperature sensors, air pressure sensors, moisture sensors, ambient light sensors and other light-based sensors, magnetic sensors, and/or other sensors. If desired, sensors 94 may include position and motion sensors such as inertial measurement units that include accelerometers, compasses, and/or gyroscopes. Control circuitry 90 may use sensors 94 to gather information such as information on movement of device 10. Haptic output components 80 in input-output devices 92 may be used to provide haptic output to a user (e.g., based on sensed movement, wirelessly received information, etc.). In some configurations (e.g., when a haptic output component 80 has a piezoelectric material), components can serve both as haptic output components 80 and as sensors 94. For example, a piezoelectric material may be driven with a signal to supply haptic output and, when not driven, may produce an output signal indicative of applied force. Using appropriate drive signals from control circuitry 90, haptic output components 80 may be used to supply a user's finger or other body part with a sensation of applied force in a given direction relative to the surface of sidewalls 80 or other housing surface of device 10. This type of haptic output, which may sometimes be referred to as directional haptic output, may be used to provide a user with sensations of increased or decreased weight, applied lateral force (e.g., force to the left or right in a horizontal plane), a sensation of device 10 slipping out of a user's grasp, a sensations of friction as a finger or other body part slides across a housing surface, etc.

Device 10 may serve as a stand-alone device. A stand-alone haptic output device may be used independently and need not be used with external equipment. Battery power and/or power received wireles sly, via wired connection, or via an energy harvesting device in device 10 may be used in powering device 10. In some stand-alone arrangements, stand-alone devices may occasionally gather information from external equipment (e.g., settings, etc.) and/or may supply output to external equipment (e.g., usage history information, etc.). In other stand-alone arrangements, stand-alone devices are never coupled to external equipment.

In other configurations, device 10 can serve as a controller for additional equipment. Device 10 may, for example, be an accessory or a stand-alone device that can operate as a remote control or other input-output device for another electronic device such as device 100. In this type of operating environment, device 100 may, as an example, be a computer, television, head-mounted display (stand-alone or tethered or otherwise coupled to an external electronic device such as device 10 and/or additional electronic equipment such as a computer, set-top box, television, etc.), and/or other electronic equipment (e.g., one or more devices such as device 10). Device 100 (or associated equipment) may be used to run a computer game or other software for a user while providing a user with visual and audio output (e.g., computer-generated images or other visual content and associated audio content). A user may interact with the game or other software by providing input to device 100 using device 10. As an example, a user may use device 10 as a game controller (e.g., a sword, joystick, magic wand, pointer, etc.). While manipulating visual objects and otherwise interacting with the software, haptic output such as in-game force feedback may be provided to the user by haptic output components 80 in device 10. The haptic output may include directional haptic output associated with the user's interactions with visual objects being displayed.

Figure 10:
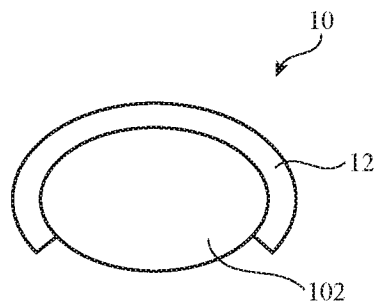
FIG. 10 is a cross-sectional side view of an illustrative electronic device mounted on a finger in accordance with an embodiment.

In the example of FIG. 10, device 10 has a finger-mounted housing such as housing 12. Housing 12 has a ring shape or a U-shape (e.g., with an exposed finger pad region) that mounts on a user's finger (finger 102). Haptic output components 80 may be formed on housing 12 to provide the user with haptic output such as directional haptic output (e.g., an apparent applied force in a given direction relative to a surface of housing 12).

Figure 11:
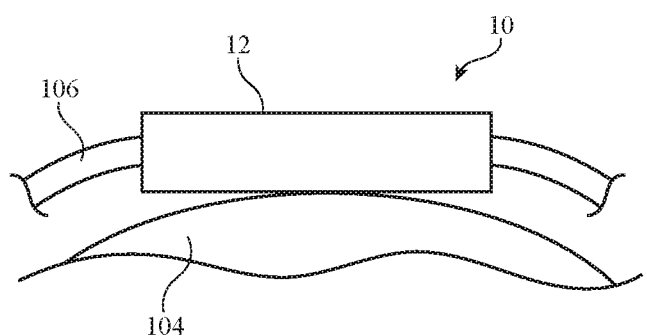
FIG. 11 is a cross-sectional side view of an illustrative wristwatch device in accordance with an embodiment.

In the example of FIG. 11, device 10 is a wristwatch device having a strap that holds housing 12 against a user's wrist (wrist 104). Haptic output components 80 may be supported against wrist 104 by wristwatch housing 12 to provide a user with haptic output. The wristwatch haptic output may include directional haptic output (e.g., an apparent applied force in a given direction relative to a surface of housing 12).

Figure 12:
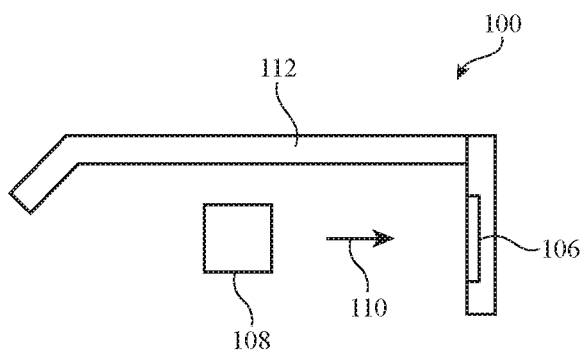
FIG. 12 is a side view of an illustrative head-mounted device in accordance with an embodiment.

As shown in FIG. 12, device 100 may be a head-mounted device such as a pair of virtual reality or mixed reality glasses. Device 100 of FIG. 12 has a head-mounted housing structure such as support structure 112 that allows device 100 and display 106 to be mounted on a user's head. In this position, a user (e.g., user eyes 108) may view display 106 in direction 110 while a speaker in housing 112 is used to play audio for the user. Haptic output components 80 may be supported by housing 12 to provide a user's head with haptic output (e.g., directional haptic output). Haptic output such as directional haptic output may also be provided using haptic output components 80 in device 10 (e.g., while the user is using device 10 to provide motion input, touch input, force input, and/or other user input to device 100 or computer equipment communicating with device 10).

Figure 13:
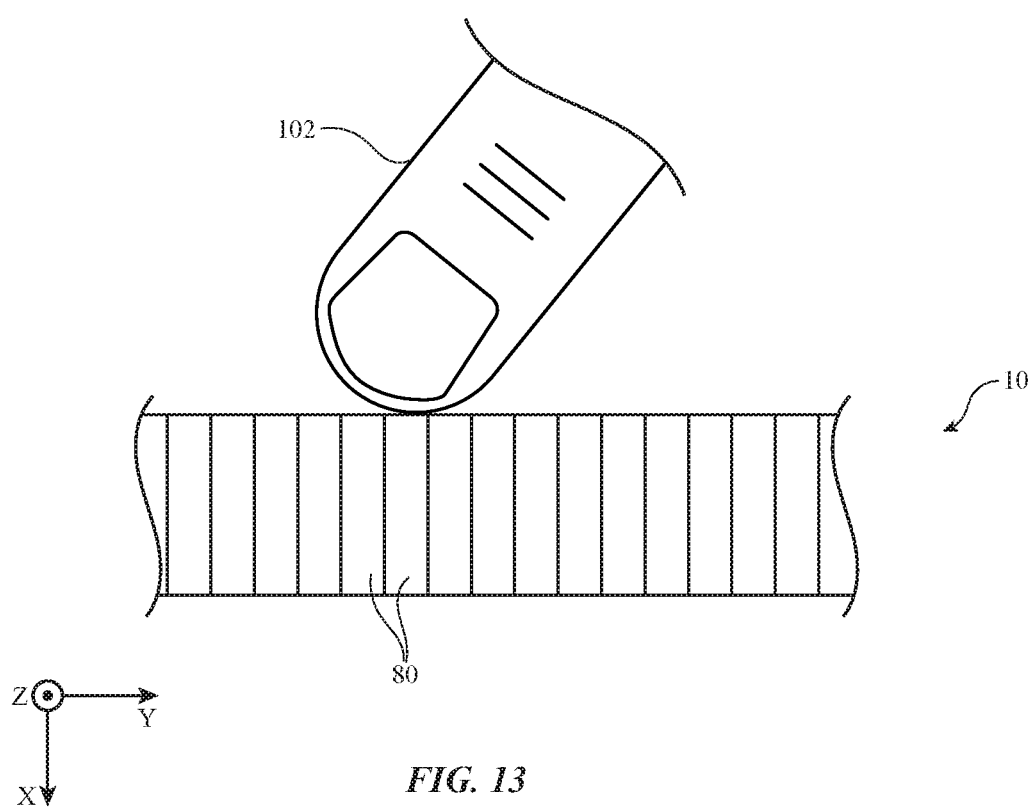
FIG. 13 is a cross-sectional side view of an illustrative haptic output device that may apply shear force to a user's finger or other external object in accordance with an embodiment.

As shown in the cross-sectional side view of FIG. 13, haptic output components 80 (e.g., components formed from stacked output components 80 such as stack-shaped haptic output component 80 of FIG. 5 and/or other stacked output components) may be configured to exhibit shearing force across most or all of the surface of a user's skin (e.g., the skin of finger 102 or other user body part). Shear force output is tangential to the surface of components 80 and the user's skin (e.g., shear forces may be applied along the Y dimension in the example of FIG. 13, when the exposed surface of components 80 and the outer surface of device 10 adjacent to user finger 102 lie in the X-Y plane). Normal forces (e.g., in the Z dimension in the illustrative configuration of FIG. 13) may also be applied by haptic output components, if desired. Shear output may be used to create sensations of movement along the surface of the user's skin. For example, shear output may create a sensation of applied force in a leftwards tangential direction relative to the surface of housing 12.

Figure 14:
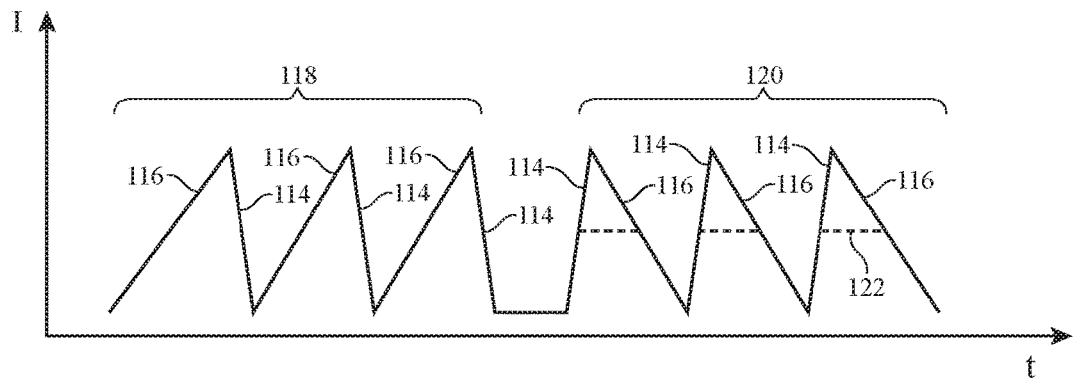
FIGS. 14, 15, 16, 17, and 18 are graphs of illustrative haptic output drive signals in accordance with embodiments.

As shown in FIG. 14, asymmetric drive signals may be applied to haptic output components 80. For example, signal I may have steeper portions such as portions 114 and less steep portions such as portion 116. In configurations in which portions 116 change slowly enough, the changes in displacement that are associated with portions 116 will not be sensed by a user. Because portions 116 are sufficiently slow in this type of configuration, the user's sense of touch will be insensitive to changes in haptic output device displacement that are associated with portions 116. Portions 114, however, change magnitude more abruptly than portions 114. As a result, the user's sense of touch will be sensitive to the changes in haptic output device displacement that are associated with portions 114. The overall result of using an asymmetric drive signal such as the illustrative asymmetrical sawtooth drive signal of FIG. 14 is that a user may sense an applied force (net normal force and/or net shearing force) in a given direction relative to the surface of housing 12 and components 80. This applied force is associated with portions 114 and will not sense restoring displacements associated with portions 116. A user may therefore be provided with the illusion of overall applied force in a single given direction even though the user's finger or other body part in contact with one or more haptic output components remains at a fixed location and the haptic output component moves back and forth by equal amounts parallel to the given direction.

Directional haptic output effects such as these may be used to provide a user who is holding device 10 or otherwise receiving haptic output from components 80 with a sensation of enhanced weight or decreased weight (apparent applied force in a given vertical direction—up or down), with a sensation of lateral applied force (apparent applied force in a given horizontal direction), with a sensation of resistance or attraction (e.g., apparent applied force in a given direction relative to a virtual object or other reference point), with a sensation of enhanced or decreased friction (e.g., by adjusting shear force to resist or assist lateral movement of a finger across a surface using a finger-mounted device, handheld device, etc.), with a sensation of compliance (e.g., the sensation of gripping a real-world object as the user is interacting with a virtual reality environment), with a sensation of striking a boundary (e.g., boundary rendering associated with moving a virtual object in a virtual reality world through a virtual boundary using user input from device 10), with feedback associated with navigation tasks or other software functions (e.g., apparent applied force in a direction associated with driving directions or other navigation system output such as apparent applied force directed to the right for right turns and to the left for left turns), with a sensation that device 10 is slipping out of the user's grasp (e.g., by applying shear forces to the user's fingers), and/or other haptic output effects.

Normal-force or shear-force haptic output components can be applied to sidewalls and other walls of housing 12 in configurations in which device 10 is a computer mouse, track pad, or other pointing device, in a configuration in which device 10 is a remote control (e.g., for a television or set-top box), when device 10 is an accessory such as a supplemental battery case (see, e.g., illustrative device 10' of FIG. 2), when device 10 is a wristwatch device, finger mounted device, head-mounted device, and/or other wearable device, or in other configurations.

Figure 15:
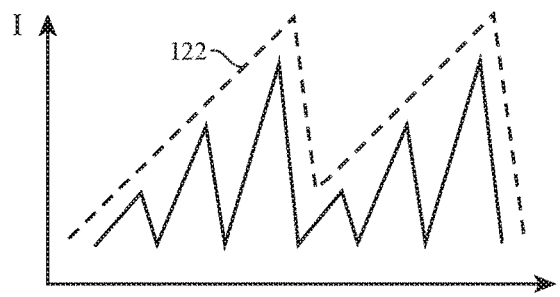
Figure 16:
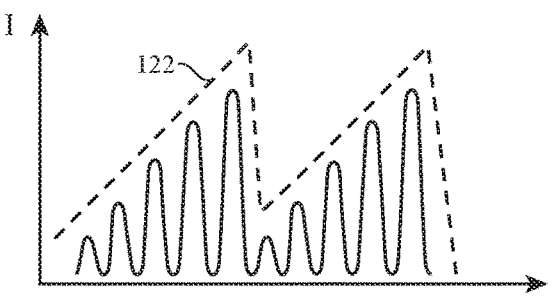
Figure 17:
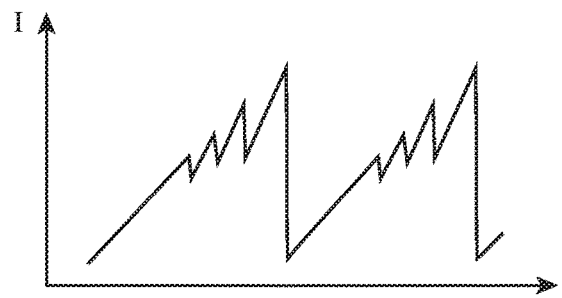
Figure 18:
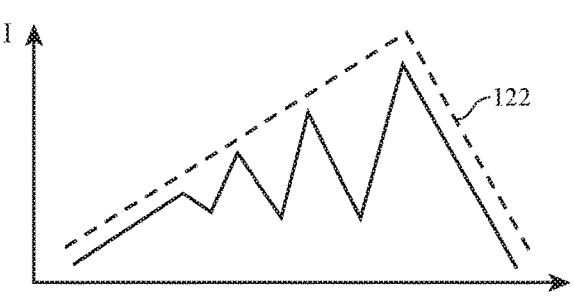

As shown in the example of FIG. 14, asymmetric drive signals may change orientation. For example, signals 118 may be used to create a sensation of applied force in a first direction whereas signals 120 (in which the positions of the steep and less steep portions of the waveform have been reversed) may create a sensation of applied force in an opposing second direction. As indicated by dashed lines 122, the peaks of sawtooth drive signals may, if desired, be truncated. FIG. 15 shows how drive signal I may have a sawtooth shape embedded in sawtooth envelope 122. FIG. 16 shows how Gaussian drive signal pulses may be embedded within sawtooth envelope 122. In the FIG. 17 arrangement, drive signal I has an overall sawtooth shape upon which smaller increasing sawtooth features have been impressed. Sawtooth pulses 124 of drive signal I of FIG. 18 have steep rising edges, which is in opposition to the overall slowly rising and rapidly falling sawtooth envelope 122 of signal I. Other drive signals may be used in controlling haptic output components 80 if desired. The arrangements of FIGS. 14, 15, 16 17, and 18 are merely illustrative.

Figure 19:
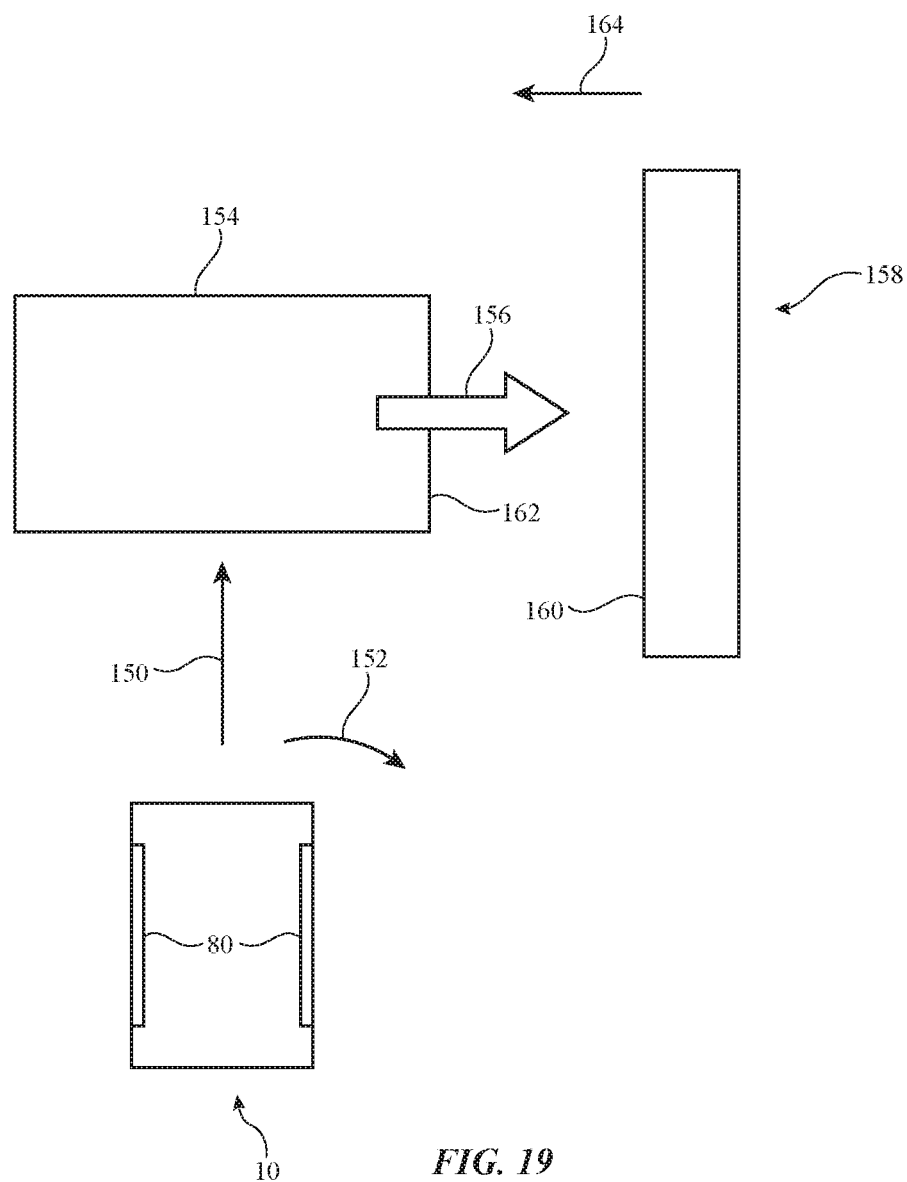
FIG. 19 is a diagram showing how an electronic device may be used to control the position of an object on a display while providing haptic feedback to a user of the device in accordance with an embodiment.

FIG. 19 is a diagram showing how a user may use device 10 to supply a system with user input to manipulate a displayed object such as object 154. A user may grip device 10 so that the user's fingers receive haptic output from output components 80 (and, if desired, provide input to overlapping sensors 94). A motion sensor in device 10 may gather motion input as a user moves device 10.

During operation of the system, object 154 may be presented to a user visually (e.g., using a display in a head-mounted device such as device 100 of FIG. 1 or other display and other optional electronic equipment such as an associated set-up box, computer, etc.). The user may use force input, touch input, motion input, voice input, and/or other user input gathered with device 10 to control the system. For example, a user may point device 10 in direction 150 at object 154 and may press on a button, touch sensor, force sensor, or other component or may otherwise indicate to device 10 that the user has selected object 154 to enable user manipulation of the position of object 154. Once object 154 has been selected, the use may move device 10 in direction 152 so that a motion sensor in device 10 can sense a desired movement of object 154 in direction 156. Motion input from device 10 can then be used by the system to move the displayed object. If desired, user input for moving object 154 may also be provided using touch input, force input, and/or other input.

When the user moves object 154 in direction 156, object 154 may come into contact (visually) with another object being displayed for the user such as object 158. As the leading surface 160 of object 154 comes into visual alignment with surface 160 of object 158, control circuitry in the system may direct haptic output components 80 to provide directional output that gives rise to a sensation of resistance to further movement of device 10. In this way, virtual boundaries may be rendered and other sensations of force can be created in association with the visual content being presented to the user (e.g., when a virtual object interacts with other virtual items). The directional haptic feedback being provided to a user in the example of FIG. 19 may be oriented in direction 164 and may be applied when surface 162 meets surface 160 to make it appear to the user as if object 154 has struck object 158 in the real world. This type of force feedback may be provided to the user in any suitable operating environment (e.g., when viewing virtual reality content and/or mixed reality content using head-mounted device, when working in a content creation or productivity application on a desktop computer, when playing a game on a television using a set-top box, when dragging displayed objects across a cellular telephone display, etc.). The use of haptic output components 80 in device 10 to render resistance to virtual object movement in a virtual reality world being presented to a user with a head-mounted display or other device 100 that communicates with device 10 is merely illustrative.

The foregoing is merely illustrative and various modifications can be made to the described embodiments. The foregoing embodiments may be implemented individually or in any combination.

What is claimed is:

1. An electronic device configured to provide haptic feedback to a user's body part, comprising:
    a housing having a sidewall with a sidewall surface;
    a display in the housing, the display having a periphery, wherein the sidewall surface has a length running along the periphery;
    a haptic output component in the housing, wherein the haptic output component includes actuators extending along the length of the sidewall surface and configured to move back and forth in a given direction parallel to the length;
    a sensor in the housing; and
    control circuitry in the housing, wherein the control circuitry is configured to gather user input with the sensor and configured to drive the haptic output component with an asymmetric signal to produce an apparent applied force to the user's body part in response to the user input while the body part remains in a fixed location relative to the haptic output component, and wherein the apparent applied force is in the given direction.

2. The electronic device defined in claim 1 wherein the sensor comprises a touch sensor and wherein the user input comprises user touch input from the touch sensor, wherein the haptic output component is configured to generate the apparent applied force in response to the user touch input.

3. The electronic device defined in claim 2 wherein the sensor and the haptic output component overlap.

4. The electronic device defined in claim 3 wherein the user input is associated with user finger movement along the sidewall in a direction opposite to the given direction and wherein the haptic output component comprises a component selected from the group consisting of: a piezoelectric haptic output component and electroactive polymer haptic output component.

5. The electronic device defined in claim 1 further comprising wireless communications circuitry configured to transmit the user input to an external electrical device.

6. The electronic device defined in claim 5 wherein the external electrical device has a display configured to display visual information based on the user input, wherein the sensor comprises a motion sensor, wherein the user input comprises user motion sensor input, and wherein the wireless communications circuitry is configured to transmit the user motion sensor input to the external electrical device to adjust the visual information.

7. The electronic device defined in claim 1 wherein the apparent applied force in the given direction relative to the surface of the sidewall is parallel to the surface.

8. The electronic device defined in claim 1 wherein the apparent applied force in the given direction relative to the surface of the sidewall is perpendicular to the surface.

9. An electronic device configured to operate with external electrical equipment to apply haptic feedback to a body part of a user, the electronic device comprising:
    a housing having a surface;
    a display in the housing, wherein the housing has four peripheral edges running along four respective edges of the display and wherein the surface runs along a given one of the four peripheral edges of the housing;
    a sensor in the housing that is configured to gather user input;
    a haptic output component comprising a stack of electrodes and interposed layers of adjustable material that expand and contract along a direction parallel to the given one of the four peripheral edges of the housing in response to signals applied to the layers with the electrodes, wherein the stack of electrodes and interposed layers of adjustable material extends continuously along the surface of the housing; and
    control circuitry configured to wirelessly control the external equipment based on the user input and configured to direct the haptic output component to produce an apparent applied force to the body part in a direction relative to the surface as the body part remains in a fixed location relative to the haptic output component.

10. The electronic device defined in claim 9 wherein the user input is used to adjust visual content on the external electrical equipment, the electronic device further comprising:
    a sidewall in the housing, wherein the surface is formed along the sidewall.

11. The electronic device defined in claim 10 further comprising a display in the housing, wherein the housing has four peripheral edges running along four respective edges of the display, and wherein the sidewall runs along one of the four peripheral edges of the housing.

12. The electronic device defined in claim 9 wherein the external electrical equipment is a head-mounted display device configured to display the visual content.

13. The electronic device defined in claim 12 wherein the sensor comprises a motion sensor.

14. The electronic device defined in claim 12 wherein the sensor and the haptic output component overlap and wherein the sensor comprises a sensor selected from the group consisting of: a touch sensor and a force sensor. output component with an asymmetric signal to produce the apparent applied force.

15. The electronic device defined in claim 9 wherein the control circuitry is configured to drive the haptic output component with an asymmetric signal to produce the apparent applied force.

16. A method of operating a system having a head-mounted device and having a cellular telephone with a motion sensor, sidewalls, and haptic output components configured to produce an apparent applied force in a direction relative to a housing surface on the sidewalls, the method comprising:

with the motion sensor, gathering user input to move a virtual object relative to other virtual items;

with the head-mounted device, moving the virtual object relative to the other virtual items on a display based on the user input, wherein moving the virtual object comprises moving the virtual object on the display based on the user input; and as the virtual object interacts with the other virtual items on the display, producing the apparent applied force in the direction relative to the housing surface with the haptic output components based on the interactions between the virtual object and the other virtual items, wherein the apparent applied force provides a sensation of resistance to further movement of the portable electronic device.

17. The method defined in claim 16 wherein producing the apparent applied force comprises moving the haptic output components into and out of a plane defined by one of the sidewalls to apply the apparent applied force to the user's finger in a direction perpendicular relative to the housing surface on the sidewalls as the user's finger remains at a fixed location relative to the haptic output components.

* * * * *

UNITED STATES PATENT AND TRADEMARK OFFICE
CERTIFICATE OF CORRECTION

PATENT NO. : 10,915,174 B1
APPLICATION NO. : 15/988936
DATED : February 9, 2021
INVENTOR(S) : Paul X. Wang and Michael Y. Cheung Page 1 of 1

It is certified that error appears in the above-identified patent and that said Letters Patent is hereby corrected as shown below:

In the Claims

Column 13, Line 9 to 11, "and a force sensor. output component with an asymmetric signal to produce the apparent applied force." should read -- and a force sensor output. --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*